United States Patent [19]

Smith

[11] Patent Number: 4,673,594
[45] Date of Patent: Jun. 16, 1987

[54] METHOD FOR APPLYING A LAYER OF FIBER ON A SURFACE AND A REFRACTORY MATERIAL PRODUCED THEREBY

[75] Inventor: William H. Smith, McMurray, Pa.

[73] Assignee: Manville Service Corporation, Denver, Colo.

[21] Appl. No.: 786,923

[22] Filed: Oct. 11, 1985

Related U.S. Application Data

[63] Continuation of Ser. No. 660,206, Oct. 12, 1984, Pat. No. 4,547,403, which is a continuation-in-part of Ser. No. 542,272, Oct. 17, 1983, abandoned.

[51] Int. Cl.$^4$ .......................... B05D 1/02; B05D 1/34; B05D 1/36
[52] U.S. Cl. .............................. 427/196; 106/287.17; 106/287.29; 427/426; 427/427; 501/95
[58] Field of Search ................ 106/85, 287.17, 287.29; 239/424.5; 427/196, 426, 427; 501/95; 428/689, 704

[56] References Cited

U.S. PATENT DOCUMENTS

| | | | |
|---|---|---|---|
| 1,718,507 | 6/1920 | Wenzel et al. | |
| 2,433,463 | 12/1947 | Lampe | 117/104 |
| 2,604,416 | 7/1952 | Dolbey | 117/100 |
| 2,842,897 | 7/1958 | Finn | 47/9 |
| 2,850,421 | 9/1958 | Thompson | 154/101 |
| 2,929,436 | 3/1960 | Hampshire | 154/1 |
| 3,107,057 | 10/1963 | Hanusch | 239/336 |
| 3,171,874 | 3/1965 | Rolle | 264/267 |
| 3,959,063 | 5/1985 | Hawthorne | 156/325 |
| 4,272,935 | 6/1981 | Lukas et al. | 52/309.11 |
| 4,492,766 | 1/1985 | Zverina et al. | 501/104 |
| 4,547,403 | 10/1985 | Smith | 427/196 |

FOREIGN PATENT DOCUMENTS

| | | |
|---|---|---|
| 1458912 | 1/1969 | Fed. Rep. of Germany . |
| 49-87723 | 8/1974 | Japan . |
| 51-40846 | 11/1976 | Japan . |
| 42583 | 3/1982 | Japan ............................... 106/287.17 |
| 120358 | 5/1970 | Norway . |
| 1142201 | 2/1969 | United Kingdom . |
| 1182241 | 2/1970 | United Kingdom . |
| 2093014 | 8/1982 | United Kingdom . |
| 2093015 | 8/1982 | United Kingdom . |

OTHER PUBLICATIONS

Manville Corporation; Cerabond advertising literature, Dec., 1984.
"New Sprayable Ceramic Fiber with Special Binder Provides Economical System for Insulating Furnaces" by Jerry Barrows; *Industrial Heating;* Apr., 1986; vol. LII, No. 4, pp. 20–21.
Ceramospray advertising literature by CAFCO and United States Mineral Company, Jan., 1984.
Keith Refractories Ltd. Technical Data Sheet, Oct. 1, 1982 and Material Safety Data Sheet, Nov. 12, 1985.
Keith Refractories Ltd. advertising literature for K-REF Bonds.

*Primary Examiner*—Michael R. Lusignan
*Attorney, Agent, or Firm*—John D. Lister; Cornelius P. Quinn; Timothy R. Schulte

[57] ABSTRACT

A method for directing a stream of bulk fibers while simultaneously spraying a solution of high temperature resistant tacky binder material into the stream of fibers. A layer of high temperature insulating fibers on a furnace, kiln, or other surface to be thermally protected may thus be formed. The layer of binder coated fibers is then cured to a monolithic layer.

12 Claims, 6 Drawing Figures

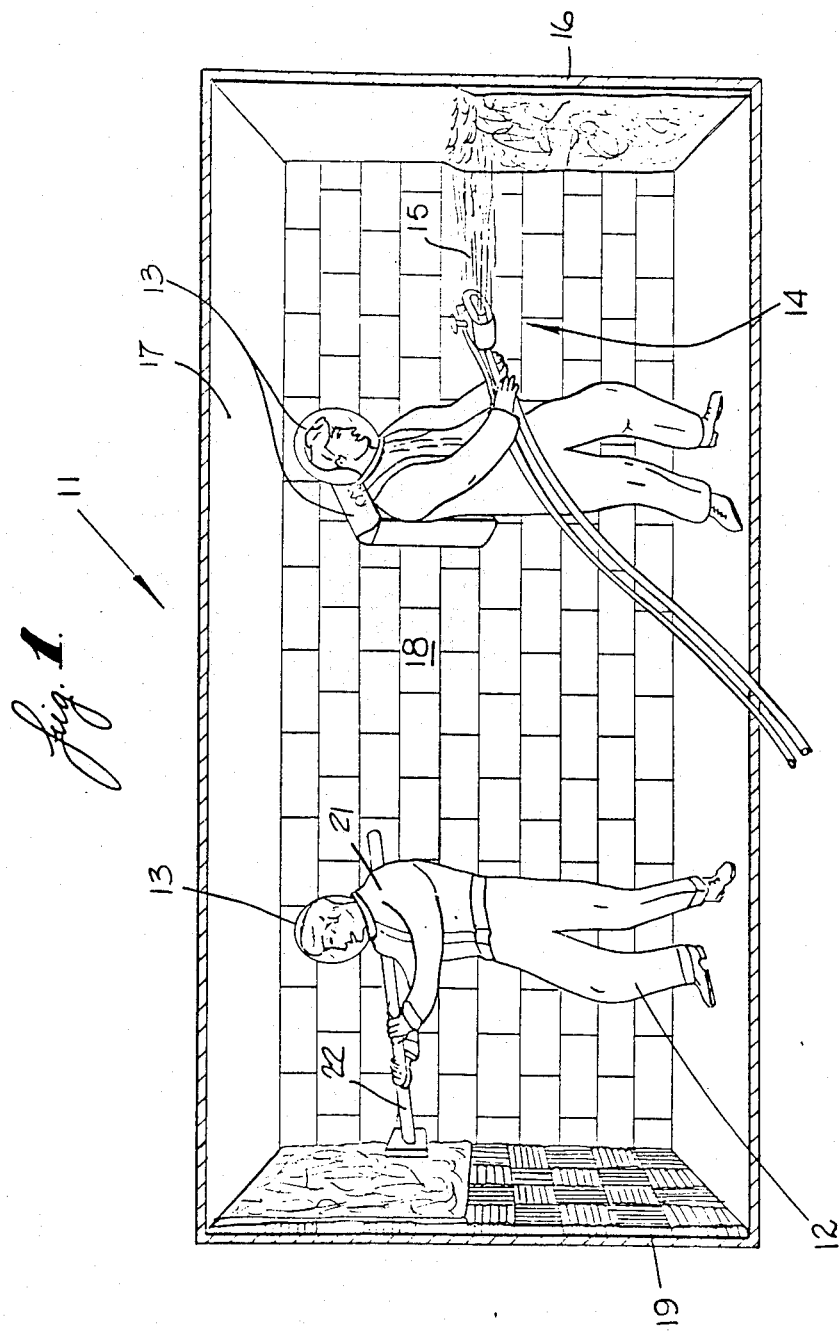

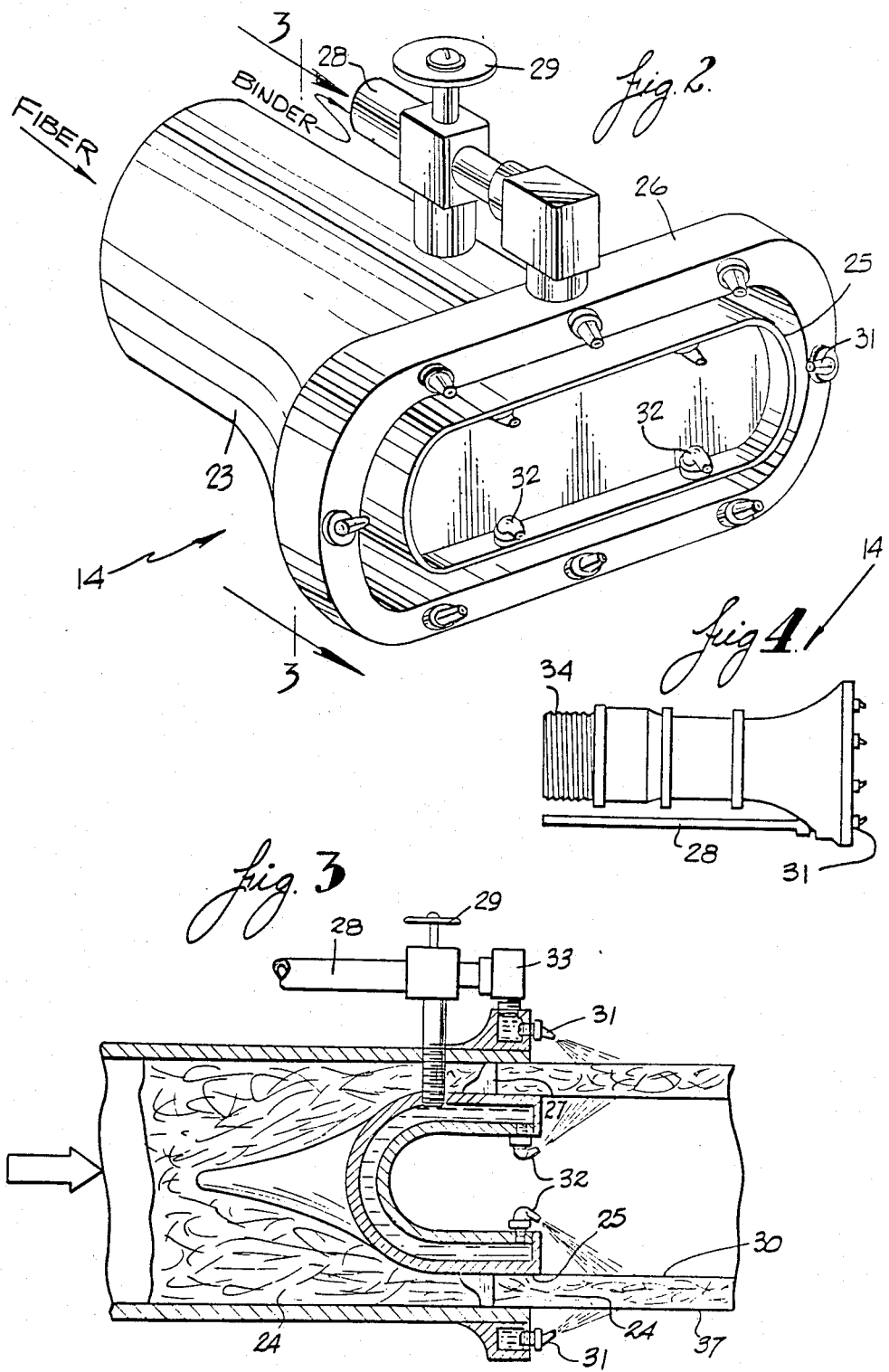

METHOD FOR APPLYING A LAYER OF FIBER ON A SURFACE AND A REFRACTORY MATERIAL PRODUCED THEREBY

REFERENCE TO RELATED APPLICATIONS

This application is a continuation of U.S. patent application Ser. No. 660,206, filed Oct. 12, 1984, now U.S. Pat. No. 4,547,403, patented Oct. 15, 1985, which is a continuation in part of U.S. patent application Ser. No. 542,272, filed Oct. 17, 1983, now abandoned.

BACKGROUND OF THE INVENTION

1. Field of the Invention

The invention relates to a method for applying a layer of fibers coated with a tacky inorganic binder onto a surface. More particularly, the invention is a method for spraying a layer of refractory fibers coated with a tacky binder including a montmorillonite clay. By way of further characterization, but not by way of limitation thereto, the invention is a method for spraying refractory fibers which have been coated with the chromium aluminum phosphate binder including a bentonite clay onto a surface and curing the coated fibers.

2. Description of the Prior Art

In the past, high temperature resistant fibrous material has been applied to heated surfaces, such as heat treating furnaces and kilns, by attaching batts or strips containing such fibers to the heated surface. This method requires mechanical anchoring or fastening means to attach the strips to the heated surface. Such mechanical attachment is expensive in that it requires large amounts of labor and fastening materials to attach the strips. In addition, because this method is time consuming, it requires the furnace or kiln to be out of service for extended periods of time. Finally, gaps between adjoining strips may occur either during the attachment process or later due to thermal shrinkage which allows heat leakage between the layers of fiber.

Improvements to this method of attaching refractory fiber linings to the wall of kilns and furnaces have been made such as is described in U.S. Pat. No. 4,381,634. This method involving the mechanical attachment of modules, overcomes many of the problems associated with layered linings especially the opening of gaps between the edges of layers due to heat shrinkage at elevated temperatures. However, like the above method, the use of modules requires mechanical attachment to the metal shells of furnaces which again require considerable cost in labor. The use of modulus has also been found to be of value in relining old dense refractory linings such as refractory brick. In this case the folded or pleated modules are glued to the old monolithic or brick lining by use of a refractory mortar or glue which is generally of the hydraulic setting nature. This method of relining of kilns is labor intensive requiring the application of mortar to the brick work and then quickly applying the folded modules thereon. This method requires that time be given for the setting of the hydraulic mortar before the newly lined kiln can be fired.

All the above methods have one feature in common which is that they present an unbonded refractory fiber lining to the interior of the kiln. As time goes by these fibers devitrify (crystallize) and in so doing lose some of their mechanical strength making them more susceptible to mechanical abrasion and destruction due to high velocity gases from the heating mechanisms of the kilns.

High temperature resistant binder powders have been mixed with water and sprayed with refractory fibers. Such methods typically employ calcium alumina cements which are very alkaline and will settle when in suspension. It is also difficult to achieve homogenous mixing of fiber and binder with such a system. A hydraulic bond must be achieved prior to drying of the cement otherwise bonding of the fibers will not occur. In addition, careful drying of the sprayed mixture must be undertaken in order to prevent violent spalling.

Other methods for spraying insulation have been employed in the past utilizing organic binders. For example, U.S. Pat. No. 2,929,436 issued on Mar. 22, 1960 discloses a method and apparatus for spraying a mixture of fibers and resin material. As indicative of prior methods of application, this patent discloses mixing fiber and resin in a nozzle and spraying the mixture onto a surface. However, while suited for its intended purpose, such method and apparatus, if used in the spraying of refractory fiber with a tacky inorganic binder, would cause clogging of the nozzle. In addition, incomplete coating of the refractory fibers could cause a weakened layer of fibers which in turn could cause failure of the insulating layer at high temperatures. Because of the temperatures to which refractory fibers are subjected, often 2,000° F. or more, such failures could be dangerous to workers in such industries as the steel industry and could cause extensive damage to furnaces and kilns. Thus, the intimate admixture of refractory fiber and the tacky inorganic binder to form a monolithic layer is important to the safe and efficient operation of such furnaces and kilns.

SUMMARY OF THE INVENTION

The invention is a method for applying a layer of fiber to a surface while simultaneously coating the fiber with a tacky inorganic binder. The layer of binder coated fiber is cured such that the layer becomes monolithic. The fibers are coated with the binder as they are directed from the spray gun and the coated fibers are caused to stick to each other and to the surface toward which they have been directed. Once the fibers have been bonded to the surface, they may be compressed by means such as tamping in order to alter the density of the layer. The layer is cured such that all of the moisture is driven out of the layer. Preferably, the layer is subjected to a temperature of at least 350° F. for a few hours in order to cure the binder and fiber. However, the layer can be immediately exposed to temperatures as high as 1000° F. without damage.

The tacky inorganic binder may be a colloidal solution of alumina, silica, or zirconia but is preferably a phosphate binder which may also include alumina, chromium oxide and boric acid. A temperature resistant clay is added to the binder to produce the tacky characteristic. Preferably, the clay is a montmorillonite clay such as western bentonite. The binder is diluted, preferably with water, prior to being sprayed onto the fibers. The binder is sprayed into the stream of fibers such that the fibers are intimately coated with the binder mixture.

BRIEF DESCRIPTION OF THE DRAWINGS

FIG. 1 is an illustration of the binder coated fiber being applied to a furnace;

FIG. 2 is an enlarged perspective view of a novel spray gun for carrying out the method of the present invention;

FIG. 3 is a vertical cross-sectional view taken along line 3—3 of FIG. 2;

FIG. 4 is an elevational view of the novel spray gun;

DESCRIPTION OF THE PREFERRED EMBODIMENT

Figure 5:
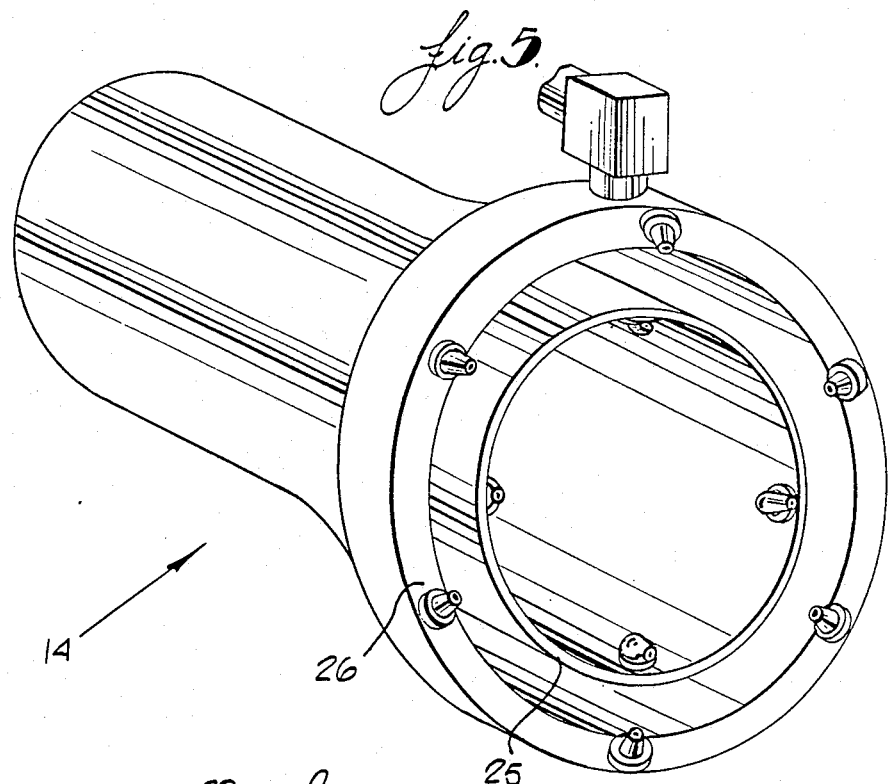
FIG. 5 is a front perspective view of an alternate embodiment of the spray gun providing a circular path.

Referring to FIG. 1, an operator 11, dressed in suitable protective clothing 12 including an enclosed breathing apparatus 13, is shown holding a spraying apparatus generally designated as 14 from which a stream 15 of binder coated refractory fiber is being directed onto furnace wall 16. As used herein, refractory fibers are defined an inorganic, amorphous, or crystalline fibers which are not adversely affected by temperatures in excess of 1500° F. Examples of such fibers are alumina-silica-zirconia fibers, alumina silica fibers and other refractory fibers as are known in the art. Preferably the fiber is blown by air pressure from a suitable compressing apparatus (not shown). Furnace wall 16 is a bare metal wall of furnace 11. Similarly, ceiling 17 is a bare metal wall of furnace 11 onto which stream 15 may be directed. A previously fired or new refractory brick wall 18 of furnace 11 may also be coated with the layer of binder coated fiber. Similarly, a wall 19 which has been previously covered with refractory fiber modules as is known to one skilled in the art may also be coated utilizing the method of the present invention. A second operator, generally designated 21, also in protective clothing and breathing apparatus, is shown with a compressing apparatus 22 which may be used for tamping the layer of binder coated fiber so as to alter the density of the layer deposited by the method of the present invention.

Referring to FIG. 2, spray gun 14 is shown in more detail. More specifically, the refractory fiber stream 24 is directed through circuit 23 so as to emerge from an annular path defined by a deflector body 25 and a manifold 26. Deflector body 25 is preferably cone shaped and is supported in a manifold 26 by one or more vanes 27 as illustrated in FIG. 3. Deflector body 25 deflects the flow of bulk fibers so as to assume an annular path in an oval or circular configuration depending upon the shape of deflector 25 and manifold 26. Thus a thin ribbon flow of fibers exits in an annular path to be coated on both sides as explained below.

The binder solution is fed through a binder feed line 27 and binder valve 28 into an external nozzle manifold 26 which feeds a plurality of spaced nozzles 31 surrounding the outside 37 of the annular fiber stream 24. Nozzles 31 are directed inwardly so as to spray the liquid binder solution onto the outer fibers 37 as they emanate from spray gun 14. Likewise, a ring of internal nozzles 32 are provided on deflector 25 so as to spray binder into the inner surface 30 of fiber stream 24. Binder is fed under pressure to nozzles 31 through binder feed line 28, valve 29 and manifold 26. Binder is fed under pressure to nozzles 32 through line 28, valve 29 and deflector 25. The fibers are uniformly wetted by the binder from two sides as they are being blown from the gun 14. Thus, the fibers are uniformly coated with liquid binder solution before reaching the surface to be coated.

Referring to FIG. 4, a side elevational view of spray gun 14 is shown as connected to flexible tubing 33. Flexible tubing 33 allows the fiber to be fed therethrough to conduit 23 in the spray gun 14 from a remote location thereby allowing the operator freedom to move about the area to be sprayed. Similarly, binder is fed to gun 14 through flexible line 28.

Referring to FIG. 5, a perspective view of an alternate embodiment of the spray gun is shown in which the deflector 25 and manifold 26 are circular such that annular path 24 of fibers being blown from the spray gun 14 is circular.

Figure 6:
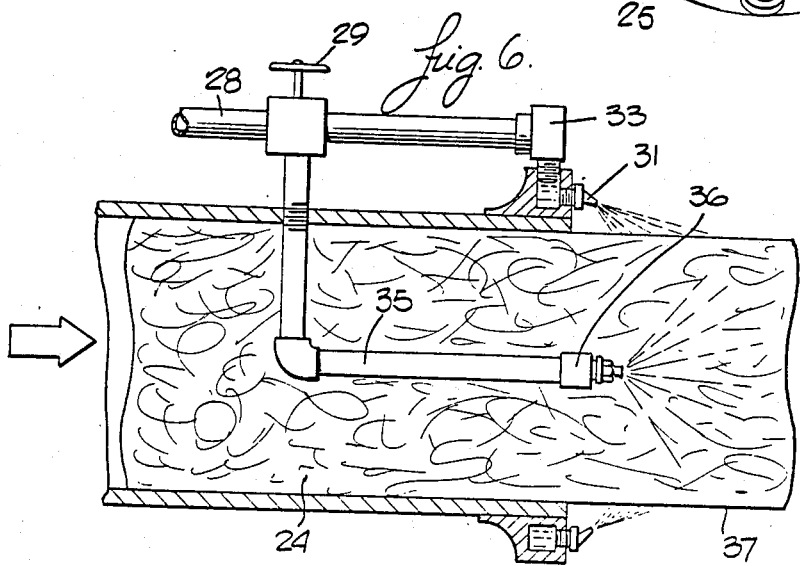
FIG. 6 is a side sectional view of a preferred spray gun for carrying out the method of the invention.

Referring to FIG. 6, a side sectional view of a preferred embodiment of a novel spray gun is shown. In this spray gun, no deflector is used to alter the path of fiber stream 24. Rather a nozzle 36 connected to, and supported by, a feed line 35 located in the approximate center of the path of fiber stream 24. Thus while nozzles 31 spray binder into the outer portions 37 of fiber stream 24, nozzle 36 ensures that the fibers in the center of fiber stream 24 are coated with binder. Nozzle 36 sprays binder in a conical path as shown in order that the fibers be completely coated. It should be expressly understood that, while one nozzle 36 is disclosed, it is within the full intended scope of the invention that more than one nozzle 36 may be located in fiber stream 24.

In practice, the method is best carried out by adding water to the tacky high temperature inorganic binder concentrate in a large drum located at the site of the surface to be sprayed. Bulk, high temperature resistant fibers such as alumina-silica-zirconia fibers are placed in a hopper and may be shredded if needed to allow blowing thereof through spray gun 14. The liquid binder concentrate is mixed with water in the drum preferably in approximately the ratio of, by volume, 4.5 parts water to 1 part binder concentrate. It should be expressly understood that the dilution ratio depends upon binder concentration and specific applications. Spraying the diluted binder directly onto the surface to be coated improves the bond of the fiber binder layer to the surface. The diluted binder is constantly stirred in the drum as it is fed to the spray gun in order to ensure a homogenous mixture of diluted binder. Referring to FIG. 6, the diluted binder solution is fed through binder feed line 28 into the external nozzle manifold 26 which feeds nozzles 31. Binder is supplied to nozzle 36 through line 35. Nozzles 31 and 36 spray binder into fiber stream 24. A ratio of about 1.75 lbs. fiber to about 1 lb. liquid binder is preferred. As with binder dilution, this ratio may be varied according to specific binder dilutions and application.

The method of the present invention ensures uniform coating of the fibers while in transit to the surface to be sprayed such that the fibers will adhere to each other as well as to the surface and form layers of wetted fibers which may be built up to the desired thickness. In practice, thicknesses of up to 14 inches of wetted fiber have been achieved. Spray gun 14 may be located between about two to four feet or more from the surface as desired. The sprayed binder solution may converge along the axis of the sprayed fibers, either before reaching the surface or, in some cases, the point of convergence may not occur at all before reaching the surface but may be at an imaginary point beyond the surface to be sprayed. The bulk fiber may be blown by a suitable blowing apparatus (not shown), preferably at a rate of up to about 200 cubic feet of air per minute through the fiber feed line 23.

The binder for use with the present method may be a suitable ceramic binder such as a phosphate or colloidal silica, alumina, or zirconia in combination with a montmorillonite clay. Also suitable in combination with the montmorillonite clay, is a phosphoric acid solution comprising about 80% of the weight of the binder concentrate. The concentrate may also be essentially chromium aluminum phosphate or it may be a chromium aluminum phosphate base with the addition of high temperature resistant clay in the amount of about 3–6% by weight. Magnesium or silica phosphates are also suitable in place of aluminum phosphate. Such high temperature resistant clay may be montmorillonite clay such as bentonite. A ball clay which includes montmorillonite could also be used. The preferred binder concentrate for use with the method of the present invention has a formula $Al_2O_3 3P_2O_5 XCr_2O_3$ wherein X ranges from point 0.1 to 10. To this preferred concentrate is added bentonite clay and boric acid, each in the amount of about 3% by weight. The specific quantity of this mixture is adjusted to approximately 1.7 by adding water.

While water is the preferred diluent because of its availability and cost, other suitable inert diluents such as alcohol or ethers may be used. Once the coated fibers have been applied to the surface as in FIG. 1, the layer of binder coated fibers may be tamped as by the second operator 21 in FIG. 1. Operator 21 is shown utilizing a compressing trowel 22 in order to pack the coated fibers to the desired density. Once the fibers have been applied to the surface to the desired density, the binder is cured, by raising the temperature of the furnace to at least 350° F. and preferably to about 450° F. or more. While this is the preferred step for curing the fibers, any curing method which drives off the water or other diluent and all moisture from the coated fiber layer may be utilized with the method of the present invention.

As shown in FIG. 1, the method of the present invention may be used to apply binder coated fiber to a variety of surfaces. While the stream of binder coated fiber may be applied directly to the surfaces without support, it may be desirable in some instances to provide additional support for the fiber layer. That is, for example, expanded metal lathe could be attached to ceiling 17 of furnace 11 in order to provide additional support for the binder coated fiber layer. Any other supporting structure as is known in the art may also be utilized. Additionally, it should be noted that the binder coated fiber is preferably applied to a surface which has been properly prepared. That is, in the case of refractory brick or other monolithic dense refractory such as shown on wall 18, such brick should be sand-blasted or otherwise prepared to remove loose or flaky material from the surface to be coated. If the binder coated fiber is to be applied to a metal surface as in 17 or wall 16 in FIG. 1, a asphaltum or other protective coating may be desired in some cases. Where the method is to be used to apply binder coated fiber to a wall of existing refractory fiber as in wall 19 of FIG. 1, it is desirable to again remove all loose or flaking surfaces from the surface to be coated. The binder coated fibers may also be applied over an existing layer of previously sprayed binder coated fibers or fibrous formed shapes. That is, should a portion of the previous layer be knocked off due to mechanical or other contact with the surface, a new layer of binder coated fibers may be applied over the damaged area. In many situations it is desirable to spray a coating of binder onto the fiber-binder layer after the layer has been applied to the surface.

It can readily be seen that this method of applying refractory fiber linings overcomes many of the shortcomings previously described. This method, for instance, does not require the application of a mortar to old brick work or refractory linings in order to apply fibers in modular form as in prior art methods. The binder supplies the adhering mechanism as the new layer is being applied which results in reduced labor costs. Nor does the present method required any particular waiting period for the mortar to form hydraulic bonds and then slowly dry out prior to firing. It can also be seen that the present method eliminates one of the basic shortcomings in prior attachment methods which required the exposed refractory fiber layer to be coated with a bonding material after the layers or modules were installed to impart abrasion resistance. The present method ensures that all fibers throughout the layer are well bonded to one another forming an inherently superior monolithic lining.

The surface of the lining applied with the present method is far less affected by mechanical or gas velocity abrasion. To support this statement the following experiment was conducted: a layer approximately 2 inches thick of 2600° F. refractory fiber (Manville CERA-CHROME) was sprayed according to the present method onto an 18"×9" free standing refractory brick wall. This wall was placed directly in front of an air natural gas burner port of a furnace so that the surface of the sprayed lining was at 90° F. to the flame at a distance of 24" from the burner. Upon repeated firing to temperatures of 2200° F., 2400° F., and 2600° F., there was no damage to the sprayed layer from this extreme condition of temperature and gas stream velocity.

A novel method has been disclosed for applying refractory or other fiber which has been coated with a binder to a surface. Because the method ensures bonding together of the high temperature resistant fibers and their adherence to a surface, thick layers of heat insulating fibers may be applied very quickly. Because the application of the insulation is done in a very small fraction of the time normally required by present methods, the cost of the installation as well as the down time of the furnace or other device to be insulated are substantially reduced. Finally, the method disclosed herein allows immediate heating of the fiber layer thereby allowing the furnace or other device to be put into service almost immediately after spraying. In fact, with the use of remote controlled devices such as robots or an air on water cooled lance, the binder fiber layer could be applied to a furnace which is at operating temperature. This would be useful to repair furnaces while still in operation.

While the invention has been disclosed with respect to preferred embodiment thereof, it is not to be so limited as changes and modifications may be made which are within the full intended scope of the invention as defined by the appended claims. For example, as shown in FIGS. 2 and 5, various geometric configurations of the spray gun may be employed so as to direct the path of the fibers to a specific application. In addition, various diluents may be used as the carrier for the binder concentrate. While chromium aluminum phosphate with bentonite clay has been disclosed as the preferred binder, other binders employing a temperature resistant clay such as montmorillonite, or plastic ball clays containing montmorillonite clay in quantities sufficient to ensure a tacky inorganic binder, may be employed. Finally, while the inventive method is disclosed with reference to spraying refractory fibers, any fiber such as fiberglass, mineral wool, or other suitable fibers may be utilized with the disclosed method. Combinations of these or different refractory fibers could also be employed to produce a stratified furnace lining which is extremely cost effective. In addition, the spraying of a binder with particulate matter such as various metallic oxides could be employed to provide a particularly heat resistant surface over the sprayed fiber-binder layer.

What is claimed is:

1. A method for forming a layer of refractory fibers on a surface comprising the steps of:
    spraying a stream of said fibers toward a surface;
    coating said sprayed fibers with an aluminum phosphate liquid binder during said step of spraying; and
    curing said coated fibers on said surface.

2. Method according to claim 1 wherein said aluminum phosphate liquid binder includes chromium.

3. Method according to claim 1 wherein said aluminum phosphate liquid binder includes a high temperature resistant clay.

4. Method according to claim 3 wherein said clay includes montmorillonite clay.

5. Method according to claim 1 wherein said refractory fibers include alumina-silica fibers.

6. Method according to claim 1 wherein said refractory fibers include alumina-silica-zirconia fibers.

7. Method for applying a layer of refractory fibers on a surface comprising the steps of:
    directing a stream of said fibers toward said surface;
    coating said directed fibers with an aluminum phosphate liquid binder during said step of directing; and
    curing said coated fibers on said surface.

8. Method according to claim 7 wherein said aluminum phosphate liquid binder includes chromium.

9. Method according to claim 7 wherein said aluminum phosphate liquid binder includes a temperature resistant clay.

10. Method according to claim 9 wherein said clay includes montmorillonite clay.

11. Method of claim 7 wherein said refractory fibers include alumina-silica fibers.

12. Method according to claim 7 wherein said refractory fibers include alumina-silica-zirconia fibers.

* * * * *